United States Patent [19]
Ohyama et al.

[11] Patent Number: 5,649,037
[45] Date of Patent: Jul. 15, 1997

[54] OPTICAL WAVEGUIDE COMPONENT AND A LIGHT SIGNAL PROCESSING METHOD USING THE SAME

[75] Inventors: Isao Ohyama; Shiro Nakamura; Takeo Shimizu; Hisaharu Yanagawa, all of Tokyo; Hideyuki Iwata, Mito, all of Japan

[73] Assignees: The Furukawa Electric Co., Ltd.; Nippon Telegraph and Telephone Corporation, both of Tokyo, Japan

[21] Appl. No.: 509,759

[22] Filed: Aug. 3, 1995

[30] Foreign Application Priority Data

Aug. 12, 1994 [JP] Japan ................................. 6-211810
Sep. 20, 1994 [JP] Japan ................................. 6-224812

[51] Int. Cl.$^6$ ............................................. G02B 6/28
[52] U.S. Cl. ................................................... 385/24
[58] Field of Search ........................ 385/24, 33, 42, 385/43

[56] References Cited

U.S. PATENT DOCUMENTS

| | | | |
|---|---|---|---|
| 4,790,614 | 12/1988 | Imoto et al. | 385/4 |
| 4,842,357 | 6/1989 | Doneen | 385/33 |
| 5,438,640 | 8/1995 | Sasaoka et al. | 385/24 X |
| 5,463,705 | 10/1995 | Clauberg et al. | 385/14 |
| 5,479,547 | 12/1995 | Kunikane et al. | 385/24 X |

FOREIGN PATENT DOCUMENTS 0005093 10/1979 European Pat. Off. .

*Primary Examiner*—Akm E. Ullah
*Attorney, Agent, or Firm*—Frishauf, Holtz, Goodman, Langer & Chick

[57] ABSTRACT

An optical waveguide component includes at least one main waveguide through which signal light and regenerating light propagate and a branch waveguide branching from the main waveguide, which are formed on the same substrate; a filter element disposed at a branch portion of these waveguides; and a plurality of reflecting elements having two reflecting faces, which are arranged in the extending direction of the branch waveguide. In the optical waveguide component, one reflecting face of the two reflecting faces is a face for reflecting the regenerating light to the filter element, and the other face is a face for reflecting the regenerating light to the direction deviating from the light axis direction of the branch waveguide, or the intervals between the reflecting elements are different from each other. This optical waveguide component enables the time-series signal processing of regenerating light to be performed accurately.

11 Claims, 12 Drawing Sheets

OPTICAL WAVEGUIDE COMPONENT AND A LIGHT SIGNAL PROCESSING METHOD USING THE SAME

BACKGROUND OF THE INVENTION

1. Field of the Invention

The present invention relates to an optical waveguide component incorporated in an optical communication system or an optical sensor system and a light signal processing method using the same and, more particularly, to an optical waveguide component which can provide reliable monitoring data when being operated by being incorporated in a system for monitoring the optical path or the light receiving terminal on the system subscriber side and a light signal processing method using the same.

2. Prior Art

In an optical communication system using optical fibers, an optical communication system, for example, as shown in FIG. 1 has been proposed as a system for monitoring the optical path and the light receiving terminal on the system subscriber side.

In this system, a light transmitting terminal A is installed at a station, from which signal light with a wavelength of $\lambda_1$ is transmitted. A light coupling/separating device B is connected to the light transmitting terminal A via an optical fiber $L_1$, and an optical time domain reflectmeter (OTDR) C is connected to the light coupling/separating device B via an optical fiber $L_2$. To monitor a fault, a regenerating light with a wavelength of $\lambda_2$ emitted from the OTDR C is superposed on the signal light at the light coupling/separating device B. The light signal is sent to light receiving terminals $E_1$ and $E_2$ on the subscriber side through optical cables $L_3$, $L_5$ and $L_4$, $L_6$ via optical waveguide components $D_1$ and $D_2$ having a wavelength selecting function and a reflecting function.

In each optical waveguide component $D_1$ and $D_2$, the transmitted light signal is separated into the signal light with a wavelength of $\lambda_1$ and the regenerating light with a wavelength of $\lambda_2$, and each signal light is received by each of the light receiving terminals $E_1$ and $E_2$ of the system subscriber.

The regenerating light with a wavelength of $\lambda_2$ is reflected by the optical waveguide component $D_1$ and $D_2$, and goes back to the light coupling/separating device B on the station side through the optical cables $L_3$ and $L_4$, where it is separated and transmitted to the OTDR C.

The optical waveguide component $D_1$ ($D_2$) has a sectional construction such that, as shown in FIG. 2 and FIG. 3, which is a sectional view taken along the line III—III of FIG. 2, a lower cladding 2a and an upper cladding 2b consisting of silica glass are formed on a substrate 1 of, for example, Si single crystal, and a waveguide core 3 is embedded in the claddings.

The waveguide core and claddings can be formed by combining the flame depositing process, photolithography, and the dry etching method.

The waveguide core 3 comprises a main waveguide 3a extending in the longitudinal direction of the substrate 1 and a branch waveguide 3b branching at a predetermined angle θ from the main waveguide 3a at an intermediate position of the main waveguide 3a. A filter element 5 is disposed at a branch portion 4 where the branch waveguide 3b branches from the main waveguide 3a.

The filter element 5 is formed as described below.

A slit 5a with a desired depth and width is formed at the branch portion 4 by, for example, combining photolithography and the dry etching method or by using a dicing saw.

Into this slit 5a, a thin film filter 5b is inserted, which has a short wavelength zone passing type dielectric thin film structure which, for example, passes a light with a wavelength of 1.3 μm, 1.55 μm ($\lambda_1$) but reflects a light with a wavelength of 1.65 μm ($\lambda_2$). A thin film filter 5b is fixed into the slit 5a with an optical adhesive 5c such as optical epoxy resin.

At this time, the filter element 5 is designed so that the path of light of wavelength $\lambda_2$ can be surely changed to the branch waveguide 3b by forming at a predetermined angle with respect to the light axis direction of the main waveguide 3a.

On the other hand, on the branch waveguide 3b, a plurality of (four in the figure) reflecting elements 6a, 6b, 6c, and 6d are arranged in the extending direction of the branch waveguide 3b.

These reflecting elements 6a, 6b, 6c, and 6d consist of slits engraved at equal intervals at right angles to the light axis direction of the branch waveguide 3b usually by combining photolithography and the dry etching method. They are filled with air. The slits may be filled with a substance having a different refractive index from that of the waveguide core composing the branch waveguide 3b, such as silicone resin.

Therefore, as shown in FIG. 4, which is a partially enlarged view of FIG. 2, the reflecting element has a rectangular shape transversing the branch waveguide 3b when viewed in plan. The reflecting element has two faces of $S_1$ and $S_2$. Each of these faces $S_1$ and $S_2$ is at right angles to the extending direction (light axis direction) of the branch waveguide 3b.

In the optical waveguide component $D_1$ ($D_2$), as shown in FIG. 2, an input side optical fiber 7a and an output side optical fiber 7b are connected to the main waveguide 3a. A light in which regenerating light with a wavelength of $\lambda_2$ is superposed on signal light with a wavelength of $\lambda_1$ is inputted from the input side optical fiber 7a.

The light goes through the main waveguide 3a and reaches the filter element 5. At the filter element 5, the signal light with a wavelength of $\lambda_1$ (1.3 to 1.55 μm) passes through the filter element 5 and goes through the main waveguide 3a on the output side, being sent to the light receiving terminal (not shown) of the system subscriber through the output side optical fiber 7b.

On the other hand, the regenerating light with a wavelength of $\lambda_2$ (1.65 μm) is reflected by the filter element 5, and goes through the branch waveguide 3b by changing its light path.

The regenerating light with a wavelength of $\lambda_2$ reaches the first reflecting element 6a. Part of the regenerating light is reflected by the face $S_1$ of the reflecting element 6a, and the remaining regenerating light passes through the reflecting element 6a, reaching the face $S_2$ of the reflecting element 6a. The part of the regenerating light reflected by the face $S_1$ goes back toward the filter element 5 along the light axis direction of the branch waveguide 3b as indicated by the arrow $q_1$ in FIG. 4. It is reflected by the filter element 5 again, and goes back to the system on the station side through the main waveguide 3a via the input side optical fiber 7a as a return light.

On the other hand, for the remaining regenerating light passing through the reflecting element 6a and reaching the face $S_2$ of the reflecting element 6a, part of it is reflected by the face $S_2$ as indicated by the arrow $q_2$, and goes back to the station side system through the branch waveguide 3b, the filter element 5, and the main waveguide 3a like the light reflected by the face $S_1$. The remaining regenerating light passing through the face $S_2$ of the reflecting element 6a goes through the branch waveguide 3b and reaches the next reflecting element 6b, where part of it goes back and the remaining light goes to the next reflecting element 6c like the case of the reflecting element 6a.

Thus, the regenerating light with a wavelength of $\lambda_2$, which is reflected by the filter element 5 and whose light path is changed to the branch waveguide 3b, is returned to the station side system as a return light while being subjected to reflection and transmission at the reflecting elements in sequence.

This return light goes back to the light coupling/separating device B shown in FIG. 1, where the light is separated and inputted to the OTDR C. Then, time-series signal processing is performed by a signal processing mechanism in the OTDR C.

This time-series signal processing is performed as described below. The processing will be explained for the case where the optical waveguide component $D_1$ in FIG. 1 has four reflecting elements disposed at equal intervals, and the optical waveguide component $D_2$ has three reflecting elements disposed at equal intervals.

First, in the optical waveguide component $D_1$, the return time of each return light going back to the OTDR C by being reflected by respective reflecting elements 6a, 6b, 6c, and 6d is converted into a distance from the OTDR C to each reflecting element. This distance and the light power of return light are monitored, and the light power of the reflected light at each reflecting element is obtained as a monitoring signal. One example of the obtained monitoring signal is shown in FIG. 5.

In FIG. 5, an arbitrary point $a_1$ is set to a reference point. A point $a_2$ at a distance of (2×F μm) from the reference point $a_1$ is a read start point of the read signal. The presence of light power is detected every F μm from the read start point $a_2$. Digital conversion is performed; the presence of light power (with reflection) is converted into 1, and the absence of it (without reflection) into 0. Thus, the bit pattern of the read signal is judged.

For example, in the case of the monitoring signal shown in FIG. 5, the bit pattern is judged to be [10101010]. That is to say, the bit pattern of the optical waveguide component $D_1$ is recognized as [10101010].

This time-series signal processing is performed in the same way for the optical waveguide component $D_2$. Since the optical waveguide component $D_2$ has three reflecting elements, the bit pattern thereof is assumed to be recognized as [10101000].

The OTDR C discriminates between the return light (read signal) from the optical waveguide component $D_1$ and the return light (read signal) from the optical waveguide component $D_2$ by identifying the difference between the bit patterns of the optical waveguide components $D_1$ and $D_2$.

When there is no fault such as a broken line on the light path, by the above-described time series signal processing, the OTDR C can usually detect each of the bit pattern return light from the optical waveguide component $D_1$ and the bit pattern of the return light from the optical waveguide component $D_2$, respectively.

However, if there is any fault such as a broken line on the side of the optical cable $L_3$ in FIG. 1, the return light from the optical waveguide component $D_1$ is not inputted to the OTDR C. Therefore, the bit pattern recognized by the OTDR C is only [10101000] based on the return light from the optical waveguide component $D_2$. Inversely, if there is any fault such as a broken line on the optical cable $L_4$, the bit pattern recognized by the OTDR C is [10101010] only.

Thus, in the optical communication system shown in FIG. 1, by performing the time-series signal processing of return light inputted to the OTDR C, the presence of broken line or other faults on the optical cables $L_3$ and $L_4$ can be determined, and which of the optical cables has a fault point can be determined.

Further, by changing the number of reflecting elements arranged on the branch waveguide, an optical waveguide component which generates a bit pattern different for each light receiving terminal of system subscriber can be manufactured, and incorporated in each light receiving terminal side. Also, by performing the detection of return light by the OTDR C and the time-series signal processing, the presence of a fault point of the light path connected between the station side and the system subscriber side and the occurrence position of the fault point can be determined.

For the conventional optical waveguide component, as described above, the reflecting element arranged on the branch waveguide has a rectangular shape at right angles to the branch waveguide when viewed in plan, and the reflecting elements are arranged at equal intervals. This poses the following problems.

First, as shown in FIG. 4, the regenerating light with a wavelength of $\lambda_2$ going through the branch waveguide 3b by changing its light path at the filter element 5 is reflected by two faces of $S_1$ and $S_2$ which are parallel with each other to form a return light. Therefore, the return lights reflected by these faces interfere with each other when returning to the OTDR C.

If such a problem occurs, the light power monitoring signal as shown in FIG. 5 cannot be detected, so that when the time-series signal processing is performed on the basis of the obtained monitoring signal, the bit pattern is mistakenly recognized inevitably.

When the interval between the reflecting elements and the width of the reflecting element itself have a substantially equal length, that is, the intervals between all the faces $S_1$ and $S_2$ are substantially equal, the number of the arranged reflecting elements are recognized mistakenly, so that it is difficult to accurately identify the bit pattern by means of the OTDR.

Further, there are the following problems.

For example, when two reflecting elements are arranged so that the bit pattern of return light from the optical waveguide component $D_1$ in FIG. 1 is [1010] and the bit pattern of return light from the optical waveguide $D_2$ is [0101], the monitoring signal shown in FIG. 6 should be obtained in the OTDR C for the former return light, and the monitoring signal shown in FIG. 7 should be obtained for the latter return light.

Since the reference point for digital conversion of the monitoring signal is not specified, in FIG. 6, if a position $F_1$ is set to the reference point $a_1$, and the position $F_2$ at a distance of 2×F from the reference point $a_1$ is set to the read start point $a_2$ of the read signal, digital conversion of the monitoring signal is performed as the bit pattern [1010]. However, in FIG. 6, if a position $F_1'$ is set to the reference point, and the position $F_2'$ at a distance of 2×F from the reference point is set to the read start point of the read signal, the bit pattern obtained in the digital conversion of the monitoring signal becomes [0101].

In FIG. 7, if a position $F_3$ is set to the reference point $a_1$, and the position $F_4$ at a distance of 2×F from the reference point $a_1$ is set to the read start point $a_2$ of the read signal, digital conversion of the monitoring signal is performed as the bit pattern [0101]. However, if the digital conversion of the monitoring signal is performed with the position $F_3'$ being set to the reference point $a_1$, the obtained bit pattern becomes [1010]. In this case, the bit pattern is the same as that obtained by the digital conversion of return light from the optical waveguide component $D_1$ with the position $F_1$ being set to the reference point all as shown in FIG. 6.

As described above, the bit pattern of return light differs depending on where the reference point $a_1$ is set for both the optical waveguides $D_1$ and $D_2$. Moreover, in the OTDR, the bit pattern [1010] and the bit pattern [0101] cannot be distinguished from each other, so that the time-series signal processing of return light from each optical waveguide component cannot sometimes be performed accurately.

Further, when the reflecting elements are arranged at equal intervals on the branch waveguide, multiple reflection occurs between the reflecting elements. Therefore, ghost information is sometimes included in the information obtained by the OTDR, resulting in erroneous recognition of data.

FIG. 8 shows a reflected waveform of return light in the case where eight reflecting elements are disposed at right angles to the light axis direction of the branch waveguide $3b$ in the optical waveguide component $D_1$ shown in FIG. 2 and regenerating light with a wavelength of ($\lambda_2$=1.65) μm is superposed on signal light with a wavelength of ($\lambda_1$=1.55) μm. This optical waveguide component $D_1$ has a 50 μm thick cladding, made of $SiO_2$, formed on a Si single crystalline substrate 1 with a length of 15 mm, a width of 5 mm, and a thickness of 1 mm. In the cladding is embedded a waveguide core 3 made of $SiO_2$-$TiO_2$ and having a path width of 8 μm, a path height of 8 μm, and a specific refractive index difference Δ: 0.3%. At the branch portion 4, a filter element 5 is formed, in which a short wavelength passing type thin film filter $5b$, which passes a light with wavelengths of 1.3 μm and 1.55 μm through a 25 μm wide slit $5a$ and reflects a light with a wavelength of 1.65 μm, is inserted and bonded with an optical adhesive $5c$. In the optical waveguide component $D_1$, eight reflecting elements consisting of a 50 μm wide transverse slit (filled with nothing: vacant filled with air) are arranged at equal intervals of 200 μm on the branch waveguide $3b$.

In FIG. 8, the first peak is a signal for the return light reflected by the filter element 5. As seen from FIG. 8, ten reflected waveforms are observed though eight reflecting elements (bit number 8) are arranged. This is because since the reflecting elements are arranged at equal intervals, and the refractive index difference between the waveguide core and the air is large, multiple reflections with high reflection power occur between the reflecting elements, resulting in mixing of a ghost signal. From this reflected waveform pattern, the ghost signal cannot be identified.

Since the reflecting elements of a rectangular shape in plan view are arranged at equal intervals at right angles to the branch waveguide on the waveguide, erroneous recognition of monitoring data occurs, so that the facilities on the system subscriber side cannot be monitored accurately.

In the case of the above-described optical waveguide component, when the component is manufactured, it is difficult to make certain what degree of loss occurs in the filter elements and the reflecting elements in forming them.

Even when a loss is found in detecting the monitoring signal of return light, it is impossible to determine whether the loss is based on the filter element or the reflecting elements or it is based on the abnormality loss of optical fiber connected to the optical waveguide component.

OBJECT AND SUMMARY OF THE INVENTION

An object of the present invention is to provide an optical waveguide component having reflecting elements which can reflect a system monitoring regenerating light inputted from an OTDR as a return light (read signal) which can be subjected to accurate time-series signal processing at the OTDR.

Another object of the present invention is to provide an optical waveguide component which can be combined detachably with an optical fiber connector, and therefore can easily be incorporated in an optical path monitoring system of an optical communication system.

Still another object of the present invention is to provide a light signal processing method in which when the time-series signal processing of return light (read signal) is performed at the OTDR by using the aforementioned optical waveguide component, the time when a regenerating light inputted to the optical waveguide component is reflected by a filter element or reflecting elements of the optical waveguide component is set to the read start point, by which the monitoring signal of return light can be processed accurately.

An additional object of the present invention is to provide an optical waveguide component in which the number of reflected waveforms of return light corresponding to the number of arranged reflecting elements can be exactly obtained by restraining multiple reflections between plural reflecting elements arranged on a branch waveguide, and the degree of loss caused by the formation of the filter element and the reflecting elements can be checked in the process of manufacturing the optical waveguide component.

To achieve the above objects, the present invention provides an optical waveguide component comprising:

at least one main waveguide through which signal light and regenerating light propagate and a branch waveguide branching from the main waveguide, which are formed on the same substrate;

a filter element, disposed at a branch portion where the branch waveguide branches from the main waveguide, for reflecting the regenerating light to send the regenerating light to the branch waveguide; and a plurality of reflecting elements each having two reflecting faces, arranged in the extending direction of the branch waveguide and intersecting the branch waveguide, for reflecting the regenerating light;

in which one reflecting face of the two reflecting faces is a face for reflecting the regenerating light to the filter element, and the other face is a face for reflecting the regenerating light to the direction deviating from the light axis direction of the branch waveguide. Also, the present invention provides an optical waveguide component in which the aforementioned optical waveguide component is contained in a housing, and pin fitting holes for the connection of an optical fiber connector are formed in the connecting end surface of the housing.

Further, the present invention provides a light signal processing method comprising the steps of:

inputting a light signal consisting of signal light and regenerating light to a main waveguide of an optical waveguide component described above;

detecting the light signal reflected by a filter element and the light signals reflected by a plurality of reflecting elements in sequence; and setting the time when the light signals reflected by the filter element or the reflecting elements are detected to the processing start time.

Also, the present invention provides an optical waveguide component comprising:

at least one main waveguide through which signal light and regenerating light propagate and a branch waveguide branching from the main waveguide, which are formed on the same substrate;

a filter element, disposed at a branch portion where the branch waveguide branches from the main waveguide, for reflecting the regenerating light to send the regenerating light to the branch waveguide; and a plurality of reflecting elements each having two reflecting faces, arranged in the extending direction of the branch waveguide and intersecting the branch waveguide, for reflecting the regenerating light;

in which the intervals between the reflecting elements are different from each other.

DETAILED DESCRIPTION OF THE INVENTION

Figure 9:
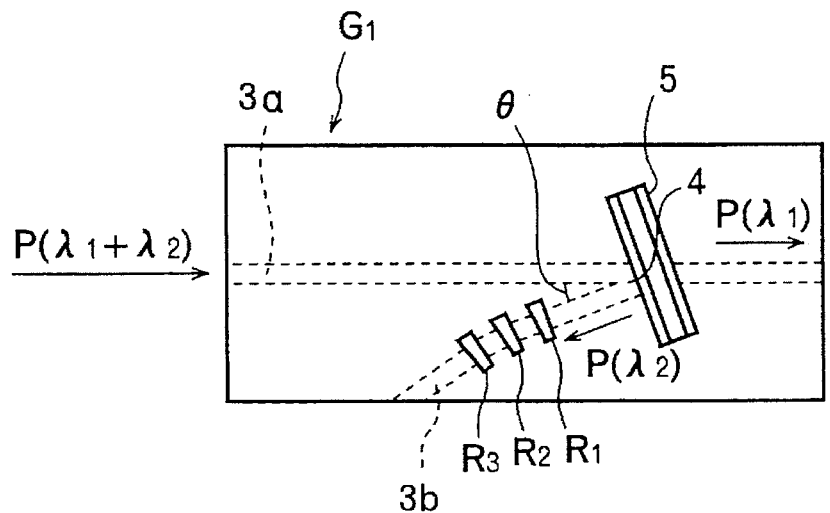
FIG. 9 is a plan view showing a typical planar pattern of an optical waveguide component $G_1$ of the present invention.
Figure 10:
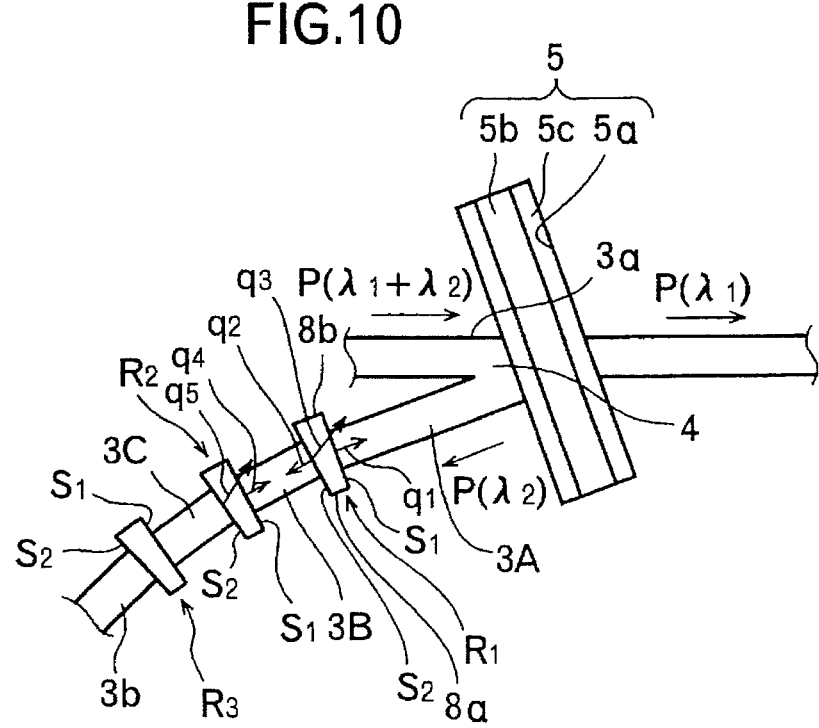
FIG. 10 is a partially enlarged view showing the arrangement of reflecting elements on the optical waveguide component $G_1$.

FIG. 9 shows a planar pattern of an optical waveguide component $G_1$ of the present invention, and FIG. 10 shows a planar pattern of the vicinity of a filter element and a branch waveguide.

Figure 2:
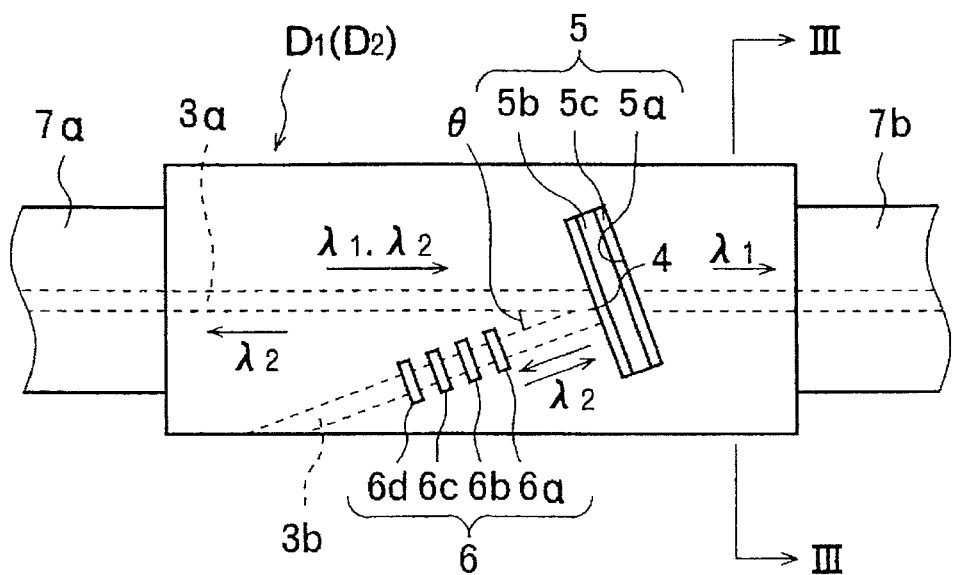
FIG. 2 is a schematic view showing a typical planar pattern of a conventional optical waveguide component.
Figure 3:
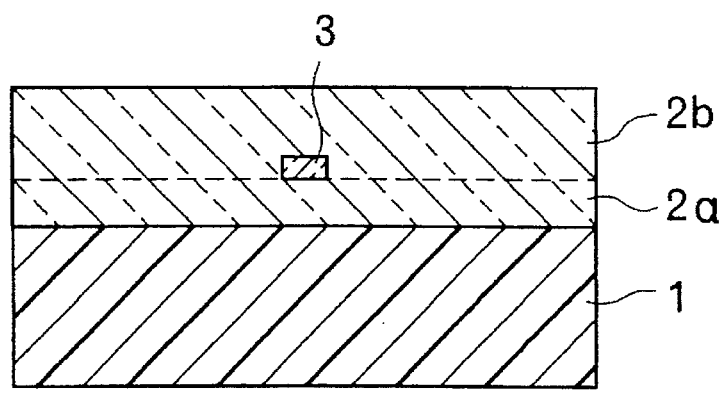
FIG. 3 is a sectional view taken along the line III—III of FIG. 2.
Figure 4:
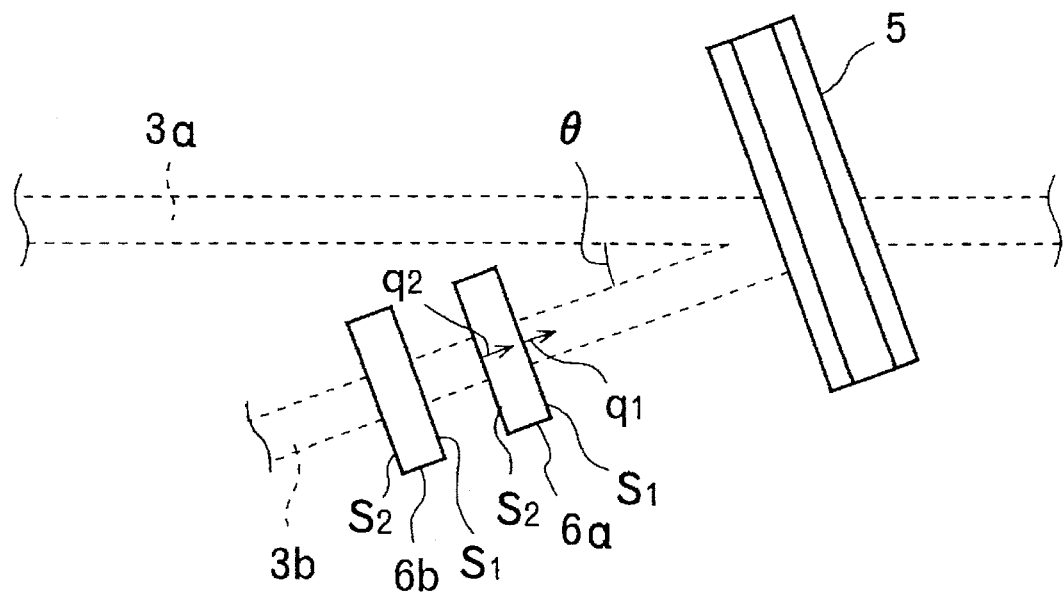
FIG. 4 is a partially enlarged view showing reflecting elements arranged on a branch waveguide shown in FIG. 3.
Figure 5:
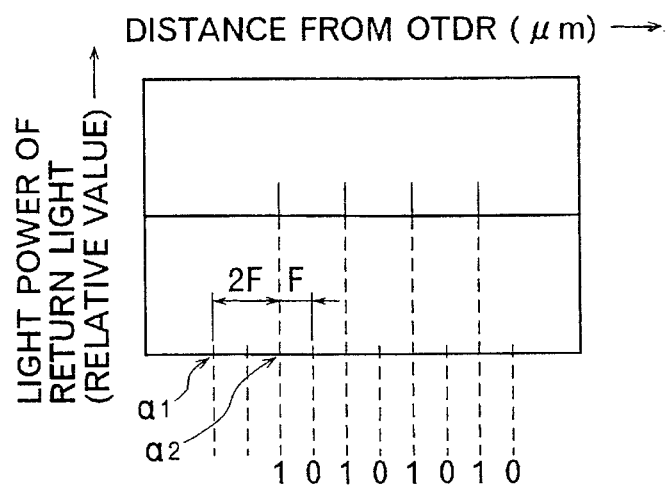
FIG. 5 is a graph showing one example of a bit pattern obtained when the time-series signal processing of a read signal from the optical waveguide component is performed by using an OTDR.

In these figures, the optical waveguide component $G_1$ is configured by one main waveguide $3a$, a branch waveguide $3b$ branching at an angle of $\theta$ at the position of a branch portion 4, a filter element 5 disposed at the branch portion 4, and a plurality of (three in the figure) reflecting elements $R_1$, $R_2$, and $R_3$ which are arranged in the extending direction of the branch waveguide $3b$ and each of which has two reflecting faces $S_1$ and $S_2$ intersecting the branch waveguide $3b$, which is similar to the conventional optical waveguide component shown in FIGS. 2 and 3.

However, for this optical waveguide component $G_1$, the planar shape of the reflecting elements $R_1$, $R_2$, $R_3$ is not rectangular unlike the reflecting element shown in FIG. 2, but has a trapezoidal pattern with a narrow head $8a$ and a wider bottom $8b$. In other words, a reflecting face $S_1$ and a reflecting face $S_2$ are not in parallel with each other.

In this optical waveguide component $G_1$, the respective reflecting faces $S_1$ of the reflecting elements $R_1$, $R_2$, and $R_3$ (the face closer to the filter element) are formed so as to be at right angles to the light axis of the respective waveguide portions 3A, 3B, and 3C of the branch waveguide $3b$ located on the upstream side of the reflecting element, while the other reflecting faces $S_2$ of respective reflecting elements (the face farther from the filter element) are inclined with respect to the light axis of the aforementioned respective waveguide portions 3A, 3B, and 3C.

Figure 11:
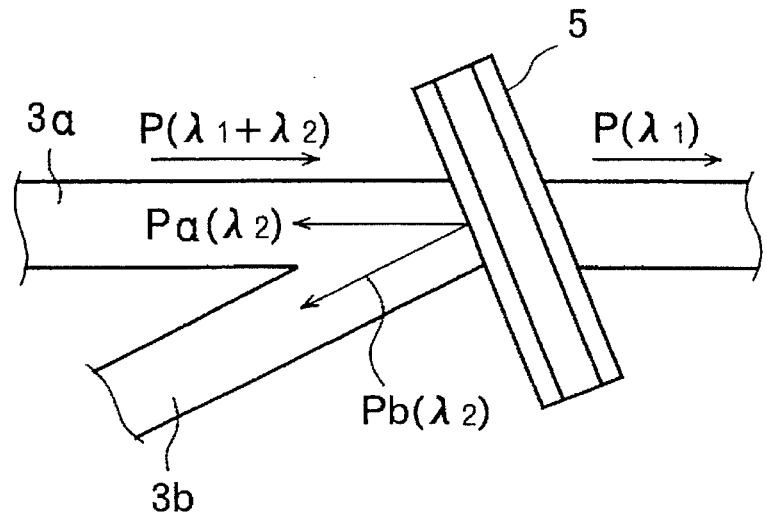
FIG. 11 is a partial schematic view showing the vicinity of a filter element.

In the optical waveguide component $G_1$, when a signal light P ($\lambda_1+\lambda_2$), which is formed by superposing a regenerating light with a wavelength of $\lambda_2$ on a signal light with a wavelength of $\lambda_1$, is inputted to the main waveguide $3a$, the signal light P ($\lambda_1+\lambda_2$) goes through the main waveguide $3a$ and reaches the filter element 5, where, as shown in FIG. 11, the signal light P ($\lambda_1$) with a wavelength of $\lambda_1$ passes through the filter element 5, but the regenerating light P ($\lambda_2$) with a wavelength of $\lambda_2$ is reflected by the filter element 5. Part of the regenerating light goes back through the main waveguide $3a$ as a reflected light Pa ($\lambda_2$), and the remaining regenerating light Pb ($\lambda_2$) goes through the branch waveguide $3b$ by changing the light path thereof.

The regenerating light Pb ($\lambda_2$) sequentially passes through the reflecting elements arranged in the extending direction of the branch waveguide $3b$ while being subjected to reflection and transmission at the respective reflecting faces $S_1$ and $S_2$ of the reflecting elements $R_1$, $R_2$, and $R_3$.

Figure 12:
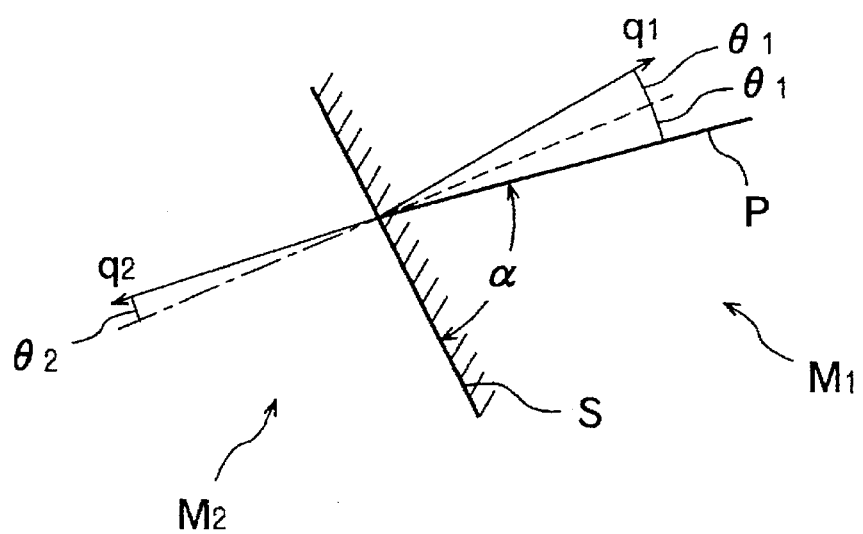
FIG. 12 is a schematic view showing a state of refraction and reflection of light at the interface between different media.

Referring now to FIG. 12, when an interface S between a medium $M_1$ having a refractive index of $n_1$ and a medium $M_2$ having a refractive index of $n_2$ intersects the light axis at an angle of $\alpha$, and a light P strikes the interface at an incident angle of $\theta_1$, part of the light P is reflected at a reflection angle $\theta_1$, which is equal to the incident angle $\theta_1$, and goes through the medium $M_1$ in the direction of arrow $q_1$. The remaining light P is refracted by the interface S at an angle of refraction of $\theta_2$ which satisfies the following equation:

$$n_1 \sin \theta_1 = n_2 \sin \theta_2 \qquad \ldots (1),$$

and goes through the medium $M_2$ in the direction of arrow $q_2$.

For example, in the case where the medium $M_1$ is silica glass, and the medium $M_2$ is air, if the light P strikes the interface S at right angles (when the incident angle $\theta_1$ is 0°), about 3% of the light power is reflected by the interface, and about 97% of the light power passes through the interface S.

Referring again to FIG. 10, when the branch waveguide 3b is made of silica glass, and the reflecting elements $R_1$, $R_2$, and $R_3$ are slits which are filled with air, the regenerating light P ($\lambda_2$) reflected by the filter element 5 goes through the waveguide portion 3A, and first strikes the reflecting face $S_1$ of the reflecting element $R_1$.

At this time, since the reflecting face $S_1$ is at right angles to the light axis of the waveguide portion 3A, a state of $\alpha=90°$ and $\theta_1=0°$ is achieved. Therefore, the light power of about 3% of the regenerating light P ($\lambda_2$) is reflected by the reflecting face $S_1$ and goes reversely through the waveguide portion 3A in the direction of arrow $q_1$ in the figure, that is, to the filter element 5 along the light axis of the waveguide portion 3A. That is to say, this reflected light always reaches the filter element 5 as a return light.

Thus, the reflecting face $S_1$ of the reflecting element $R_1$ functions as a regenerating light reflecting face which always reflects the inputted regenerating light P ($\lambda_2$) toward the filter element 5.

On the other hand, the light power of about 97% of the regenerating light P ($\lambda_2$) passes through the reflecting face $S_1$, going through the interior of the reflecting element $R_1$ (air) to reach the other reflecting face $S_2$.

Part of the light power (about 3%) is reflected by the reflecting face $S_2$, and the remaining light power (about 97%) passes through the reflecting face $S_2$ and goes through the waveguide portion 3B.

When the reflecting face $S_2$ consists of an inclined face intersecting the light axis of the waveguide portion 3A at an intersection angle of $\alpha$, the regenerating light does not strike the reflecting face $S_2$ from the perpendicular direction, but at an incident angle $\theta_1=(90-\alpha)$. Therefore, at the reflecting face $S_2$, a state of $\theta_1=(90-\alpha)$ is achieved in FIG. 12, so that the inputted regenerating light is reflected at a reflection angle of $(90-\alpha)$. The reflected light goes in the direction of arrow $q_3$ in FIG. 10, deviating from the light axis direction of the waveguide portion 3A, so that it does not return toward the filter element 5.

Thus, the reflecting face $S_2$ of the reflecting element $R_1$ functions as a reflecting face such that the reflected regenerating light does not return to the filter element 5.

To deviate the regenerating light reflected by the reflecting face $S_2$ from the light axis direction of the waveguide portion 3A, the incident angle of regenerating light to the reflecting face $S_2$ should be 8° or larger. In other words, the reflecting face $S_2$ may be formed so that the intersection angle between the reflecting face $S_2$ and the light axis direction of the waveguide portion 3A is 82° or smaller.

Thereupon, in the reflecting element $R_1$, the regenerating light reflected by the reflecting face $S_1$ and the regenerating light reflected by the reflecting face $S_2$ do not return to the filter element 5 together with each other in the waveguide portion 3A. Therefore, the interference of the return lights does not occur.

The return light from the reflecting element $R_1$ is only the regenerating light reflected by the reflecting face $S_1$, and this return light is reflected by the filter element 5, goes back through the main waveguide 3a again, and is detected by the OTDR as a monitoring signal, so that the OTDR can surely identify the monitoring signal as a return light from the reflecting element $R_1$.

In FIG. 10, the regenerating light passing through the reflecting face $S_2$ of the reflecting element $R_1$ must go along the light axis direction of the waveguide portion 3B positioned on the downstream side.

In this case, the regenerating light passing through the reflecting face $S_2$ of the reflecting element $R_1$ is refracted by the reflecting face $S_2$ by satisfying the relationship of Eq. (1), and goes in the direction of arrow $q_2$ as shown in FIG. 12. Therefore, the waveguide portion 3B connected to the reflecting face $S_2$ is formed so that the light axis thereof coincides with the direction of arrow $q_2$ in FIG. 12. That is to say, the light axis directions of the waveguide portion 3A and the waveguide portion 3B do not agree with each other, but are deviated slightly from each other.

The regenerating light going through the waveguide portion 3B along the light axis direction thereof reaches the next reflecting element $R_2$, where the same action as explained on the reflecting element $R_1$ is accomplished. Specifically, the regenerating light reflected by the reflecting face $S_1$ of the reflecting elements $R_2$ goes through the waveguide portion 3B, the reflecting element $R_1$, and the waveguide portion 3A as indicated by the arrow $q_4$ in FIG. 10, and reaches the filter element 5, by which the light is reflected and goes back through the main waveguide 3a as a return light. The regenerating light reflected by the reflecting face $S_2$ of the reflecting elements $R_2$ deviates from the light axis direction of the waveguide portion 3B as indicated by the arrow $q_5$ in FIG. 10, so that the reflected light does not return toward the filter element 5. Therefore, the lights reflected by the reflecting faces $S_1$ and $S_2$ of the reflecting element $R_2$ are not coupled together, so that the interference does not occur. The return light to the OTDR is the regenerating light reflected by the reflecting face $S_1$, and the OTDR surely identifies the reflecting element $R_2$ by this return light.

The regenerating light passing through the reflecting face $S_2$ of the reflecting element $R_2$ goes through the waveguide portion 3C along the light axis direction thereof as described above, and strikes the next reflecting element $R_3$. As described above, the light reflected by the reflecting face $S_1$ is surely identified by the OTDR as the return light, and the light reflected by the reflecting face $S_2$ deviates from the light axis direction of the waveguide portion 3C.

As described above, for the optical waveguide component $G_1$, a plurality of reflecting elements of planar trapezoidal pattern are arranged in the extending direction of the branch waveguide 3b so that the inclined face thereof is located as a reflecting surface farther from the filter element 5. Therefore, the regenerating light reflected by the reflecting face $S_2$ deviates from the light axis direction of the branch waveguide 3b and does not return to the OTDR, while only the regenerating light reflected by the reflecting face $S_1$ returns to the OTDR as the return light. Thereupon, the OTDR can surely identify the monitoring signal of return light from all reflecting elements.

By using the optical waveguide component $G_1$, light signals are processed as described below in the present invention.

Figure 1:
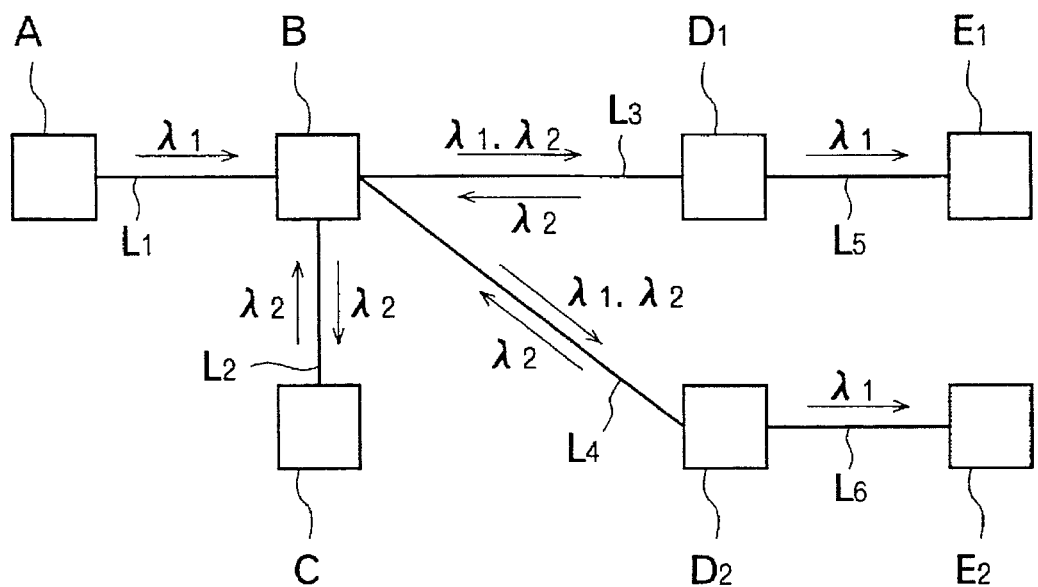
FIG. 1 is a schematic view showing a system for monitoring a fault point of an optical communication system using an OTDR.

In the optical communication system in FIG. 1 in which the optical waveguide components $G_1$, $G_1$ of the present invention shown in FIGS. 9 and 10 are incorporated in place of the conventional waveguide components $D_1$ and $D_2$, the light signal, which is formed by superposing the regenerating light with a wavelength of $\lambda_2$ from the OTDR C on the signal light with a wavelength of $\lambda_1$ sent from the light transmitting terminal A on the station side first goes into the waveguide components $G_1$, $G_1$.

As shown in FIGS. 10 and 11, the light signal P $(\lambda_1+\lambda_2)$ going through the main waveguide $3a$ reaches the filter element 5, where the signal light P $(\lambda_1)$ passes through the filter element 5, part of the regenerating light (called regenerating light Pa $(\lambda_2)$) is reflected and returned to the side of the main waveguide $3a$, and the remaining light changes its path to the branch waveguide $3b$ as the regenerating light Pb $(\lambda_2)$.

The regenerating light Pb $(\lambda_2)$ passes through the reflecting elements $R_1$, $R_2$, $R_3$, ... $R_n$ (n denotes an integer) in sequence. In this process, one return light corresponding to each reflecting element is surely detected by the OTDR C as the monitoring signal of regenerating light $P_1$, regenerating light $P_2$, regenerating light $P_3$, ... and regenerating light $P_n$.

These regenerating lights are returned to the OTDR C with a time difference corresponding to the distance between the OTDR C and respective reflecting elements $R_1$, $R_2$, $R_3$, ... and $R_n$.

Figure 6:
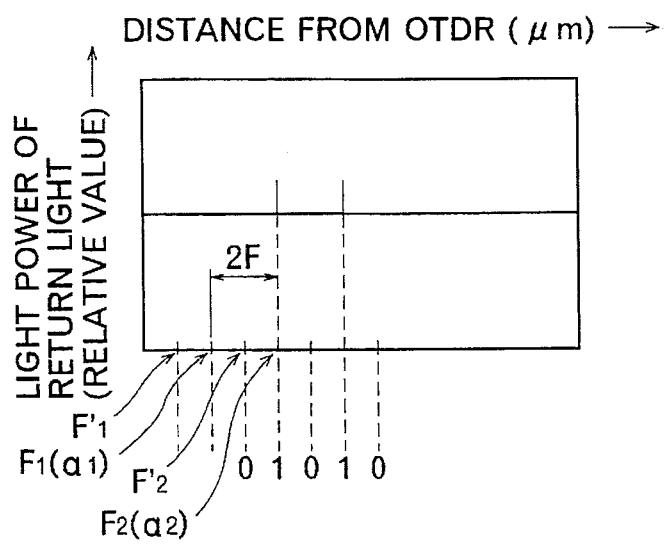
FIG. 6 is a graph showing another bit pattern.
Figure 7:
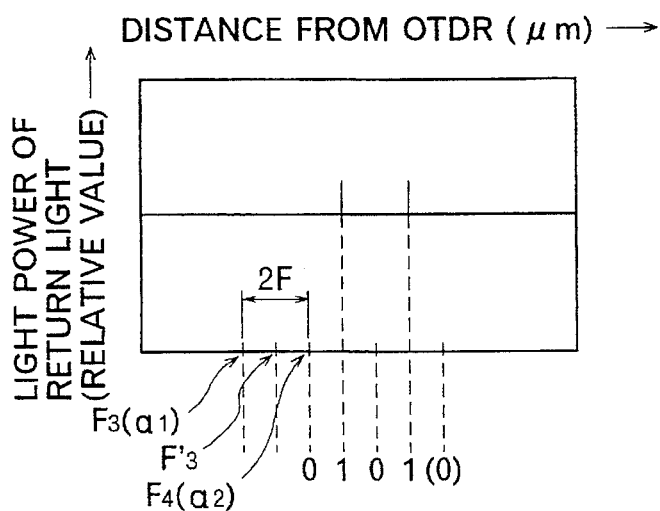
FIG. 7 is a graph showing still another bit pattern.
Figure 8:
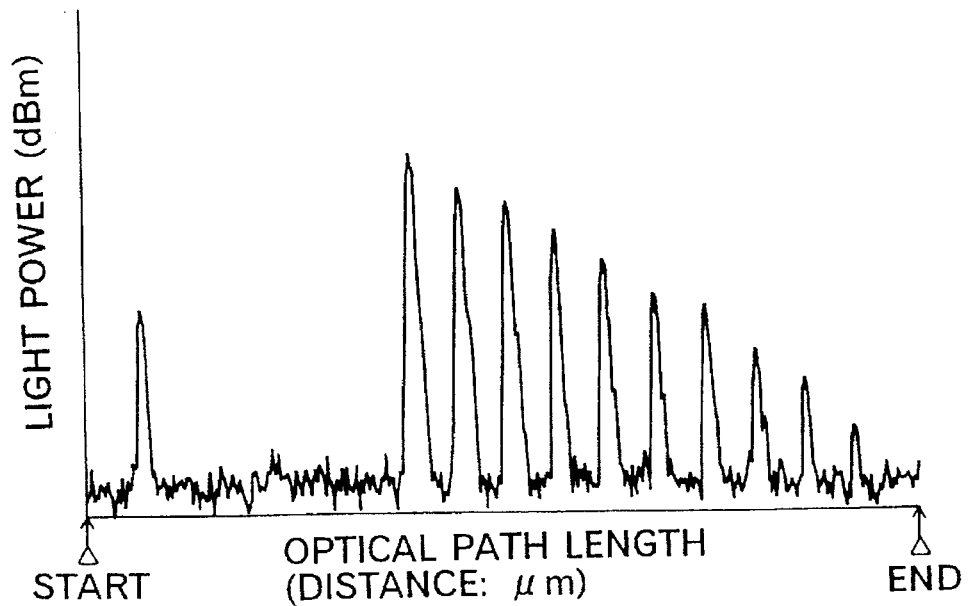
FIG. 8 is a graph showing a reflected waveform of return light from the optical waveguide component.

In the light signal processing method of the present invention, therefore, when the digital conversion of the monitoring signal is performed at the OTDR C, the regenerating light Pa $(\lambda_2)$ directly reflected by the filter element 5 is defined as the reference light for specifying the read position of read signal, for example, and as shown in FIG. 6, a position $F_1$ of this reference light is set to the reference point $a_1$, and the position $F_2$ at a distance of $2 \times F$ from the reference point $a_1$ is set to the read start point $a_2$ to perform time-series signal processing.

For example, the refractive index of the first reflecting element $R_1$ is made different from that of the other reflecting elements $R_2$, $R_3$, ... and $R_n$ so that the light power of the regenerating light $P_1$ at the reflecting face $S_1$ of the reflecting element $R_1$ differs from the light power of the regenerating light $P_2$, $P_3$, ... and $P_n$ at other reflecting elements $R_2$, $R_3$, ... and $R_n$, the aforementioned regenerating light Pa $(\lambda_2)$ is defined as the reference light, and the position of the light is set to the reference point $a_1$ in FIG. 6, by which time-series signal processing may be performed.

The reflecting element whose refractive index is changed is not always limited to the first reflecting element $R_1$. The refractive index of only one arbitrary reflecting element arranged at the second or subsequent position may be changed to detect the monitoring signal, and the position of the regenerating light reflected by the reflecting element having a different refractive index may be set to the reference point.

The refractive index can be changed, for example, by filling the reflecting elements $R_2$, $R_3$, ... and $R_n$, which are slits, with air, and by filling the slit of the reflecting element $R_1$ with a material having a refractive index different from that of air.

In the light signal processing method of the present invention, since the reference point $a_1$ is definite, the bit pattern obtained by the digital conversion at the OTDR corresponding to the arrangement of the reflecting elements is definitely specified.

According to the present invention, the conventional problem in that it is difficult to identify the bit pattern and it is impossible to accurately perform time-series signal processing can be eliminated completely.

Figure 13:
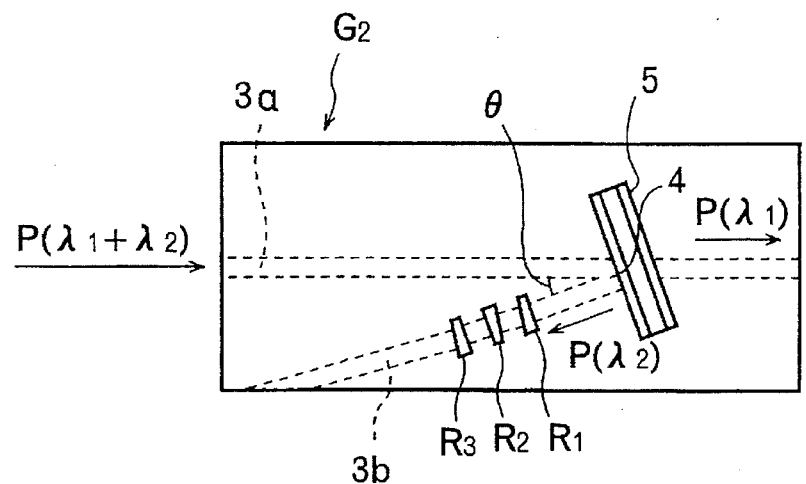
FIG. 13 is a plan view showing a typical planar pattern of an optical waveguide component $G_2$ of the present invention.
Figure 14:
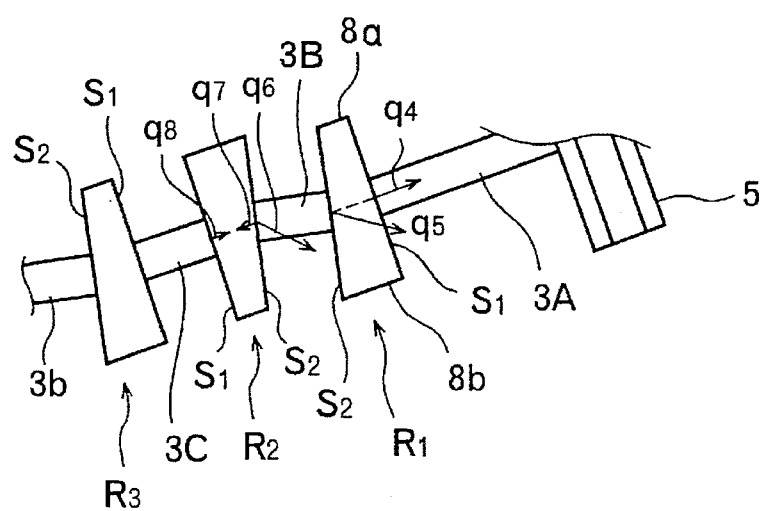
FIG. 14 is a partially enlarged view showing the arrangement of reflecting elements on the optical waveguide component $G_2$.

FIG. 13 is a planar pattern view of another optical waveguide component $G_2$ of the present invention, and FIG. 14 is a planar pattern view showing the reflecting elements and branch waveguide.

In this optical waveguide component $G_2$, the planar shape of the respective reflecting elements $R_1$, $R_2$, and $R_3$ arranged on the branch waveguide $3b$ are trapezoidal as with the case of the optical waveguide component $G_1$.

However, the trapezoidal pattern of the adjacent reflecting element is a pattern in which the head $8a$ and the bottom $8b$ are positioned alternately.

For example, when the reflecting face $S_1$ of the reflecting element $R_1$ is at right angles to the light axis direction of the waveguide portion 3A and the reflecting face $S_2$ is inclined, the reflecting element $R_2$ arranged next has an inclined face $S_2$ facing the inclined face $S_2$ of the reflecting element $R_1$, and the face $S_1$ of the reflecting element $R_2$ is at right angles to the light axis direction of the waveguide portion 3C. The reflecting face $S_1$ of the reflecting element $R_3$ is at right angles to the light axis direction of the waveguide portion 3C, and faces the vertical face $S_1$ of the reflecting element $R_2$.

Thus, in the optical waveguide component $G_2$, the reflecting elements having a planar pattern of reverse direction are arranged alternately in the extending direction on the branch waveguide $3b$.

In the arrangement mode shown in FIG. 14, when the faces facing with each other are vertical faces $S_1$, $S_1$ of the trapezoidal pattern as are on the reflecting elements $R_2$ and $R_3$, these faces $S_1$, $S_1$ are formed as a face at right angles to the light axis direction of the waveguide portion 3C connecting these faces. When the faces facing each other are inclined faces $S_2$, $S_2$ of the trapezoidal pattern as are on the reflecting elements $R_1$ and $R_2$, these faces $S_2$, $S_2$ are formed as a face inclined with respect to the light axis direction of the waveguide portion 3B connecting these faces.

By using such an arrangement mode, in the case of the optical waveguide component $G_2$ shown in FIGS. 13 and 14, the faces of the reflecting element facing each other, such as the face $S_2$ of the reflecting element $R_1$ and the face $S_2$ of the reflecting element $R_2$, the face $S_1$ of the reflecting element $R_2$ and the face $S_1$ of the reflecting element $R_3$, ..., are formed so as to be substantially parallel with each other, by which the regenerating light Pb $(\lambda_2)$ reflected by the filter element 5 can go through the waveguide portions 3A, 3B, and 3C while passing through a plurality of reflecting elements. In this arrangement mode, the waveguide portion connecting the reflecting elements can be formed substantially straight. Therefore, the total length of the branch waveguide $3b$ can be made short as compared with the curved waveguide, so that the whole component can be made compact.

In the case of this optical waveguide component $G_2$, for the regenerating light Pb $(\lambda_2)$, which is reflected by the filter element 5 and whose light path is changed to the branch waveguide $3b$, part of the regenerating light Pb $(\lambda_2)$ is reflected by the face $S_1$ at right angles to the light axis of the reflecting element $R_1$, goes back through the waveguide portion 3A in the direction of arrow $q_4$, and always returns to the filter element 5 as a return light. Part of the regenerating light passing through the face $S_1$ is reflected by the face $S_2$. This reflected light goes in the direction of arrow $q_5$, deviating from the light axis direction of the waveguide portion 3A, and does not return to the filter element 5. That is to say, the number of returned light from the reflecting element $R_1$ is one.

The regenerating light passing through the face $S_2$ of the reflecting element $R_1$ goes through the waveguide portion 3B along the light axis direction of the waveguide portion 3B, and reaches the face $S_2$ of the reflecting element $R_2$.

Here, consideration will be given to the incidence of the regenerating light to the face $S_2$ of this reflecting element $R_2$ and the resultant reflection and refraction at the face $S_2$.

First, in Eq. (1), when $n_1 > n_2$, the relationship of $\theta_1 < \theta_2$ holds. Therefore, when the waveguide portion 3B is made of silica glass and the reflecting element $R_2$ consists of a hollow slit, the above relationship holds between the angle of incidence $\theta_1$ and the angle of refraction $\theta_2$ of the regenerating light striking the face $S_2$.

That is to say, the angle of refraction $\theta_2$ of the regenerating light which is refracted by the face $S_2$ and inputted into the reflecting element $R_2$ is larger than the angle of incidence $\theta_1$ to the face $S_2$. In the case where this relationship holds, when $\theta_2$ is 90°, all of the light power of the regenerating light striking the face $S_2$ is reflected by the face $S_2$ and goes back to the waveguide portion 3B; therefore, the regenerating light does not reach the other face $S_1$ of the reflecting element $R_2$ and the following waveguide portion 3C. Thereupon, the meaning of arrangement of the second, the third, . . . reflecting elements on the branch waveguide 3b disappears.

When the incident angle of the regenerating light is taken as $\theta_{10}$ when the above trouble occurs, the incident angle $\theta_{10}$ satisfies the equation, $$\sin \theta_{10} = n_2/n_1 \qquad \ldots (2)$$

based on Eq. (1) since $\theta_2 = 90°$.

Therefore, to prevent all of the light power of the regenerating light from being reflected by the face $S_2$, a relationship between the light axis direction of the waveguide portion 3B and the face $S_2$ should be established so that the incident angle $\theta_1$ of the regenerating light striking the face $S_2$ is smaller than $\theta_{10}$. In other words, the face $S_2$ of the reflecting element $R_2$ should intersect the light axis of the waveguide portion 3B at an angle larger than $(90 - \theta_{10})$.

For example, when the waveguide portion 3B is made of silica glass and the reflecting element $R_2$ is a hollow slit (filled with air), the above angle $\theta_{10}$ is 43°. At this time, the angle with which the face $S_2$ intersects the light axis of the waveguide portion 3B is $90° - 43° = 47°$.

If the face $S_2$ of the reflecting element $R_2$ shown in FIG. 14 is formed so as to intersect the light axis of the waveguide portion 3B at an angle larger than 47°, the trouble can be avoided in which all of the light power of the regenerating light striking the face $S_2$ from the waveguide portion 3B is reflected. In this case, in order for the regenerating light reflected by the face $S_2$ to go by deviating from the light axis direction of the waveguide portion 3B, the angle of the face $S_2$ with respect to the light axis direction of the waveguide 3B must be 82° or smaller as explained for the reflecting element of the optical waveguide component $G_1$.

By forming the face $S_2$ of the reflecting element $R_2$ as described above, part of the regenerating light striking the face $S_2$ from the waveguide portion 3B is reflected and goes in the direction of arrow $q_6$, deviating from the light axis direction of the waveguide portion 3B. The remaining passing regenerating light refracts at the face $S_2$ and goes through the reflecting element $R_2$ in the direction of arrow $q_7$ and strikes the face $S_1$. At the face $S_1$ of the reflecting element $R_2$, part of the light is reflected and goes in the direction of arrow $q_8$. The reflected light going in the direction of arrow $q_8$ always returns to the filter element 5 through the waveguide portion 3B, the reflecting element $R_1$, and the waveguide portion 3A as a return light. That is to say, the number of the return light from the reflecting element $R_2$ is one.

The regenerating light passing the face $S_1$ of the reflecting element $R_2$ goes along the light axis direction of the waveguide portion 3C, and strikes the face $S_1$ of the reflecting element $R_3$. The striking regenerating light accomplishes the reflecting and passing actions as with the case of the reflecting element $R_1$; part of the light always returns to the filter elements 5 as a return light. Therefore, the return light from the reflecting element $R_3$ is one.

In the case of the optical waveguide component $G_2$, therefore, like the case of the optical waveguide component $G_1$, accurate time-series signal processing of light signal can be performed by using the light signal reflected directly by the filter element 5 as the reference light or by using one of the return lights from the reflecting elements as the reference light.

Figure 15:
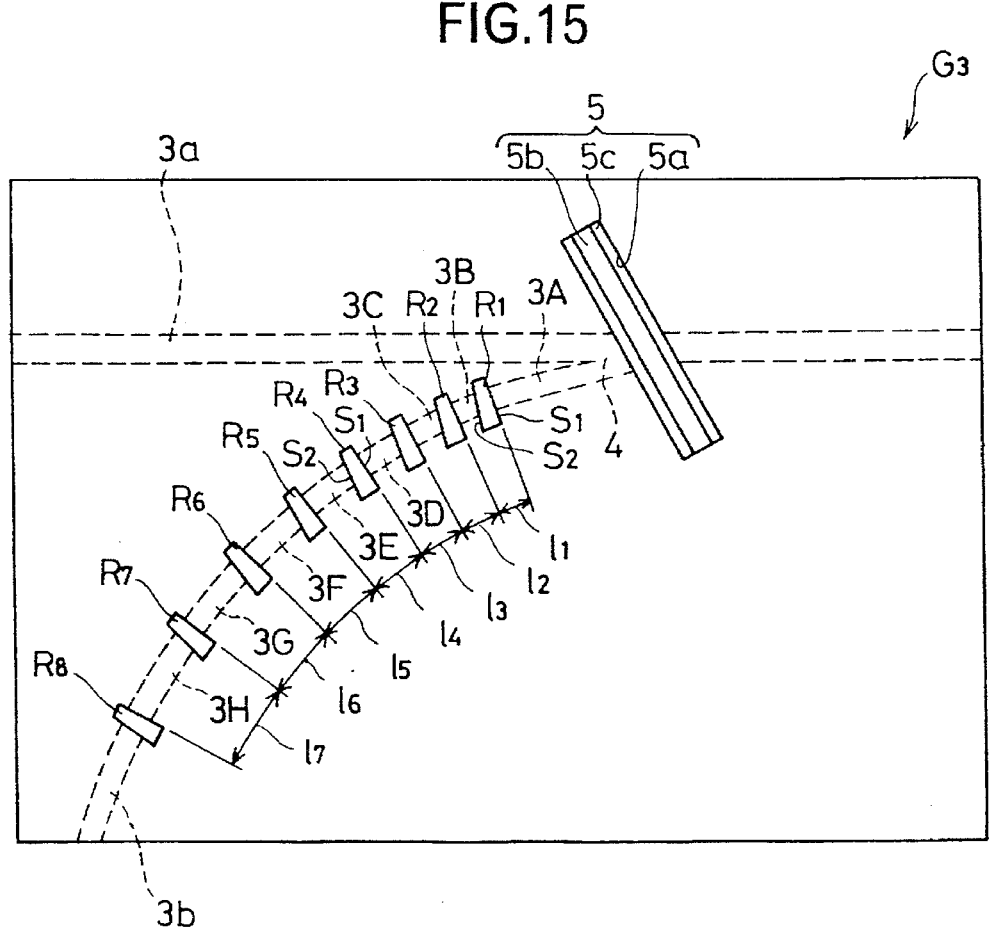
FIG. 15 is a plan view showing a typical planar pattern of another optical waveguide component $G_3$.

FIG. 15 is a view showing a planar pattern of another example $G_3$ of the optical waveguide component of the present invention.

This optical waveguide component $G_3$ is configured so that a branch waveguide 3b, which branches from the main waveguide 3a at the branch portion 4, is formed by one curved waveguide, and a plurality of (eight in the figure) reflecting elements $R_1$, $R_2$, $R_3$, $R_4$, $R_5$, $R_6$, $R_7$, and $R_8$ with a trapezoidal pattern viewed in plan are arranged on the branch waveguide 3b.

The planar pattern of the reflecting elements $R_1$ to $R_8$ may be rectangular as shown in FIG. 2. However, when the pattern is rectangular, the maximum value of each reflected waveform is divided into two when the return light is measured by the OTDR, resulting in slightly poor pattern recognition. Therefore, the trapezoidal pattern which provides one maximum value of the reflected waveform is preferable.

In these reflecting elements $R_1$ to $R_8$, the reflecting face $S_1$ located on the side of the filter element 5 is at right angles to the light axis direction of the respective waveguide portions 3A, 3B, 3C, 3D, 3E, 3F, 3G, and 3H located on the upstream side of the respective reflecting elements. The reflecting face $S_2$ is inclined with respect to the light axis direction of the waveguide portion 3A to 3H.

The intervals $l_1$, $l_2$, $l_3$, $l_4$, $l_5$, $l_6$, and $l_7$ between the reflecting faces $S_1$ of the reflecting elements are different. In particular, it is preferable that these intervals be in a form of arithmetical progression series.

In this optical waveguide component $G_3$, since all of the intervals between the plural reflecting elements $R_1$ to $R_8$ arranged on the branch waveguide 3b are different, the multiple reflection of regenerating light between the reflecting elements, which is reflected by the reflecting element, is inhibited, and the light reflected by each reflecting element returns to the filter element 5 as one return light corresponding to each reflecting element, going back to the OTDR. Therefore, an accurate bit pattern can be obtained when the time-series signal processing is performed by the OTDR.

Embodiment 1

The optical waveguide component $G_1$ shown in FIGS. 9 and 10 was manufactured as described below.

First, a 20 μm thick lower cladding layer made of $SiO_2$ was formed by the flame depositing method on the surface of a 1 mm thick Si single crystal substrate, and an 8 μm thick core slab made of $SiO_2$-$GeO_2$ was formed on the lower cladding layer. Then, a waveguide core of a planar pattern shown in FIG. 9 with a path width of 8 μm and a path height of 8 μm was formed in the core slab by applying photolithography and the dry etching method. A 20 μm thick upper cladding layer was formed on the waveguide core again with the flame depositing method so that the waveguide core is embedded in the cladding.

Next, three transverse slits, which have intervals of 100 μm between the reflecting faces $S_1$ and are of trapezoidal shape viewed in plane as shown in FIG. 10, were engraved at preset positions on the branch waveguide $3b$ by applying photolithography and dry etching technique to form hollow reflecting elements $R_1$, $R_2$, and $R_3$ (filled with air).

These slits have the face $S_1$ at right angles to the light axis direction of respective waveguide portions 3A, 3B, and 3C located on the upstream side of the face $S_1$, and the face $S_2$ intersecting the light axis of respective waveguide portions 3A, 3B, and 3C at an intersection angle of 82°. The first reflecting element $R_1$ is formed at a position 200 μm apart from the branch portion 4.

Then, a slit $5a$ with a width of 25 μm and a depth of 300 μm was engraved at the branch portion 4 by using a dicing saw. Into the slit 5 was inserted a short wavelength zone passing type thin film filter $5b$ which transmits light with a wavelength of 1.60 μm or shorter but reflects light with a wavelength longer than 1.60 μm. The thin film filter $5b$ fixed into the slit with an optical adhesive $5c$ to form the filter element 5.

The optical waveguide components $G_1$, $G_1$ were incorporated in the optical communication system shown in FIG. 1, and a signal light with a wavelength of 1.55 μm was sent from the light transmitting terminal A on the station side. The signal light, on which a regenerating light with a wavelength of 1.65 μm was superposed from OTDR C, was sent to the main waveguide $3a$.

The monitoring signal of return light was detected by the OTDR C, and the digital conversion of light signal was performed at intervals of 50 μm with the position of the regenerating light directly reflected by the filter element 5 to the main waveguide $3a$ being taken as the reference point $a_1$ and the position at a distance of 200 μm from the reference point $a_1$, i.e. the position corresponding to the position of the reflecting element $R_1$ being taken as the read start point $a_2$.

Figure 16:
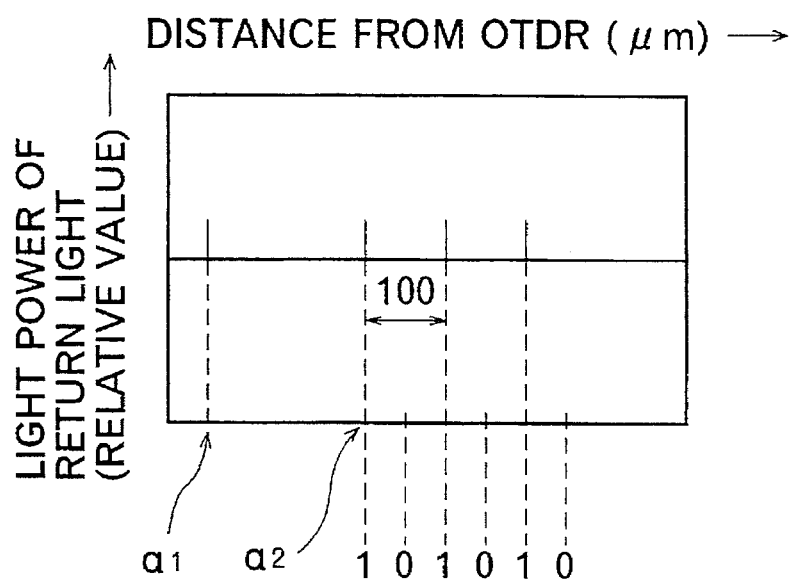
FIG. 16 is a graph showing a bit pattern obtained by the time-series signal processing of the Embodiment 1.

The result is shown in FIG. 16.

As seen from FIG. 16, the obtained bit pattern is recognized accurately as [101010]. This is because the return lights from the reflecting elements did not interfere with each other, only the regenerating lights reflected by the reflecting faces $S_1$ went back as return lights, and the time-series signal processing was performed with the reference point $a_1$ being determined as the position of the regenerating light reflected directly by the filter element 5.

Embodiment 2

Figure 17:
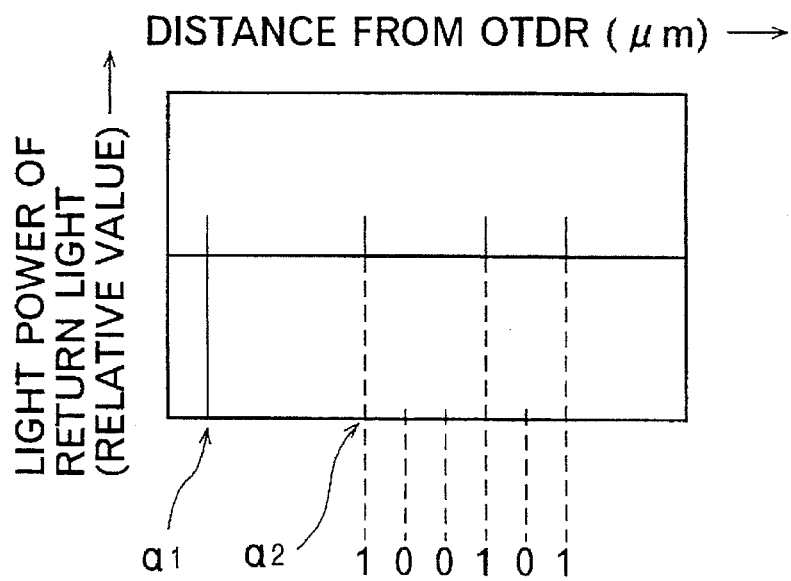
FIG. 17 is a graph showing a bit pattern obtained by the time-series signal processing of the Embodiment 2.

In the optical waveguide component $G_1$ of Embodiment 1 shown in FIG. 10, the interval between the reflecting element $R_1$ and the reflecting element $R_2$ was set at 150 μm, and the interval between the reflecting element $R_2$ and the reflecting element $R_3$ was set at 100 μm. Like Embodiment 1, the time-series signal processing was performed with the position of the regenerating light directly reflected by the filter element 5 being taken as the reference point $a_1$ and the position of the return light from the reflecting element $R_1$ being taken as the read start point $a_2$. The result is shown in FIG. 17.

In this case as well, an accurate bit pattern [100101] was obtained corresponding to the arrangement locations of the reflecting elements.

Embodiment 3

Figure 18:
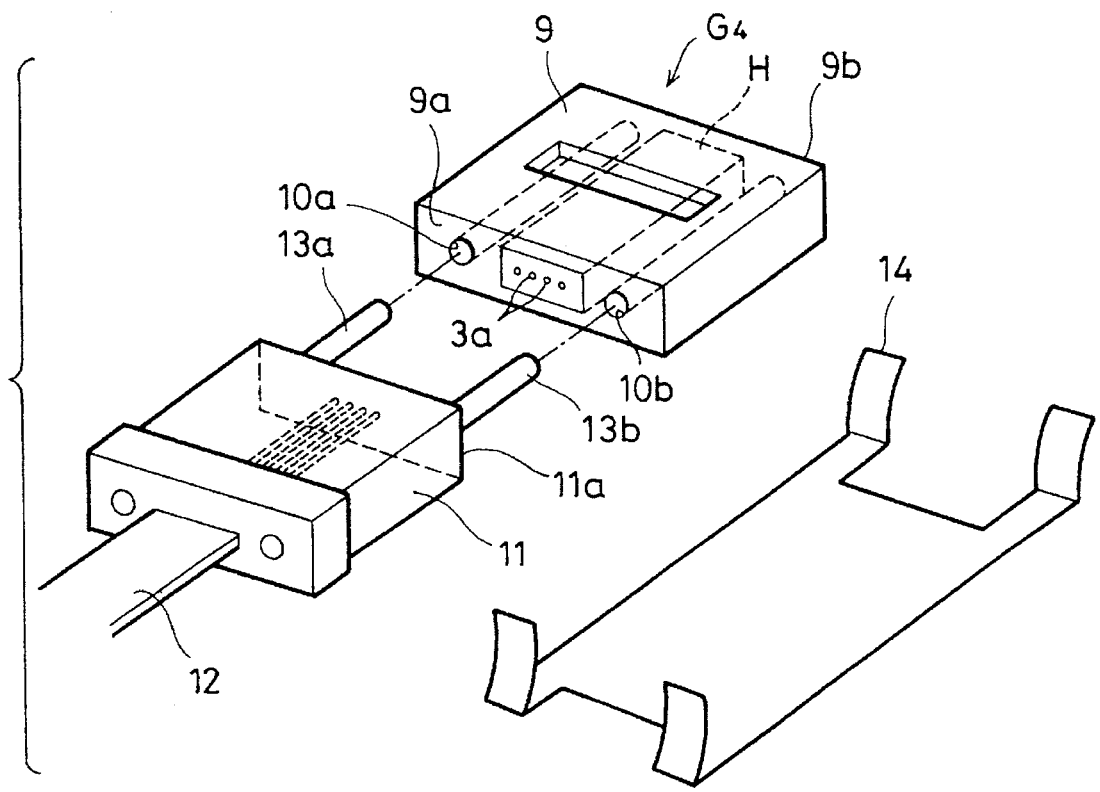
FIG. 18 is a perspective view showing the outline of the optical waveguide component $G_4$ of the present invention.

FIG. 18 shows another optical waveguide component $G_4$ of the present invention.

This optical waveguide component $G_4$ has a construction which contains an optical waveguide chip H, described later, in a housing 9. At both sides of the housing 9, two pin fitting holes $10a$ and $10b$ are formed. At one end surface $9a$, the input-side end of the optical waveguide chip contained in the housing 9 is exposed, while at the other end surface $9b$, the output-side end is exposed.

Figure 19:
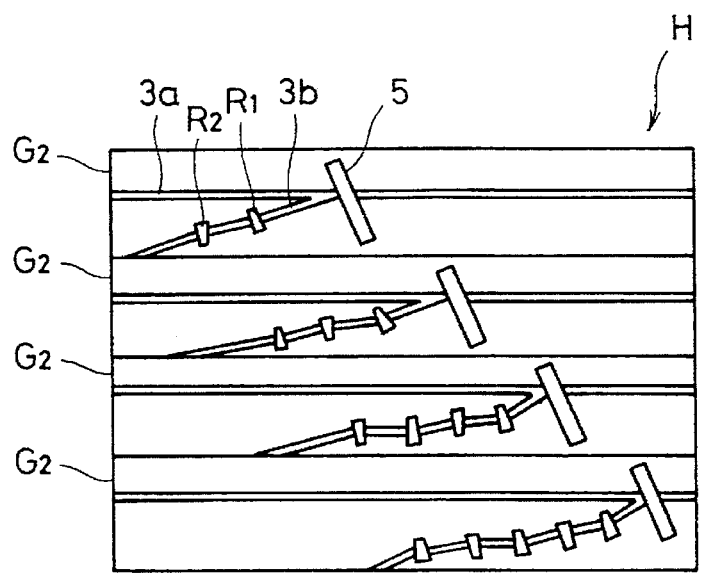
FIG. 19 is a plan view showing one example of an optical waveguide chip used in the optical waveguide component $G_4$.

FIG. 19 shows one example of the optical waveguide chip H contained in the housing 9.

This optical waveguide chip comprises four optical waveguide components $G_2$ shown in FIG. 13 arranged in parallel, and the number of reflecting elements arranged on the branch waveguide $3b$ of each optical waveguide component $G_2$ is two, three, four, and five.

Therefore, on each of the end surfaces $9a$ and $9b$ of the housing 9 in FIG. 18, four input and output ends of the main waveguides $3a$ of the optical waveguide components $G_2$ are exposed.

This optical waveguide component $G_4$ is used practically by combining with an optical fiber connector 11.

On the end surface $11a$ of the optical fiber connector 11, each optical fiber end of an optical fiber cable 12 is exposed. At both side portions of the optical fiber connector 11, pins $13a$ and $13b$, which can be fitted into the pin fitting holes $10a$ and $10b$ of the housing, are disposed in a protruding manner. The pitch of the optical fiber ends exposing on the end surface $11a$ is equal to the pitch between the main waveguides $3a$ exposed on the end surface $9a$ of the housing 9.

In practical use, the pins $13a$ and $13b$ of the optical fiber connector 11 are inserted in the pin fitting holes $10a$ and $10b$ of the housing 9 to engage the end surface $9a$ of the housing 9 with the end surface $11a$ of the optical fiber connector 11, and then the whole structure is fixed by fitting a contacting clip 14 from the outside of the housing 9 and the optical fiber connector 11.

The ends of the main waveguides $3a$ of the optical waveguide components $G_2$ exposed on the end surface $9a$ of the housing 9 are optically connected to the ends of the optical fibers of the optical fiber connector 11, which enables light signals to be sent to each optical waveguide component $G_2$ composing the optical waveguide chip H.

In this state, a light signal consisting of signal light and regenerating light is sent from the optical fiber cable 12, by which accurate time-series signal processing can be performed by the function of the optical waveguide component $G_2$ composing the optical waveguide chip H in the housing.

For this optical waveguide component $G_4$, the optical waveguide components $G_2$ can be connected optically to the optical fiber connector 11 in a detachable manner. Therefore, the optical fibers for transmitting light signal can optically be connected easily and simultaneously to the main waveguides of the optical waveguide components for performing the processing of light signal, which makes the optical waveguide component $G_4$ suitable.

In this optical waveguide component $G_4$, the optical waveguide chip H contained in the housing 9 is not limited to the configuration shown in FIG. 19. For example, the number of the optical waveguide components $G_2$ arranged in parallel may be determined corresponding to the number of optical fibers disposed in the optical fiber connector 11. Also, the chip may have a monolithic construction in which a required number of main waveguides, branch waveguides, filter elements, and reflecting elements are formed on one substrate without being in parallel.

Embodiment 4

An optical waveguide $G_3$ of a planar pattern shown in FIG. 15 was manufactured under the same manufacturing conditions as those of Embodiment 1 except that the intervals between the reflecting elements were changed when the reflecting elements were formed on the branch waveguide 3b.

The intervals between the reflecting elements $R_1$ to $R_8$ of this optical waveguide component $G_3$ are as follows: $l_1$=100 μm, $l_2$=120 μm, $l_3$=140 μm, $l_4$=160 μm, $l_5$=180 μm, $l_6$=200 μm, and $l_7$=220 μm.

The optical fibers were connected to the main waveguides 3a of this optical waveguide component $G_3$. The other ends of the optical fibers were connected to the optical connector, and the optical fiber was 2 m in length. The reflected waveform of this component was observed by using an interference type measuring instrument using a low coherence light source (a precision refractometer), and the reference fiber of 2 m of the length. The waveform shown in FIG. 20 was obtained.

The reflecting elements $R_1$ to $R_8$ were filled with silicone resin so that the difference in the refractive index from the branch waveguide 3b was 0.002. When the reflected waveform was measured in this state, the waveform shown in FIG. 21 was obtained.

Figure 20:
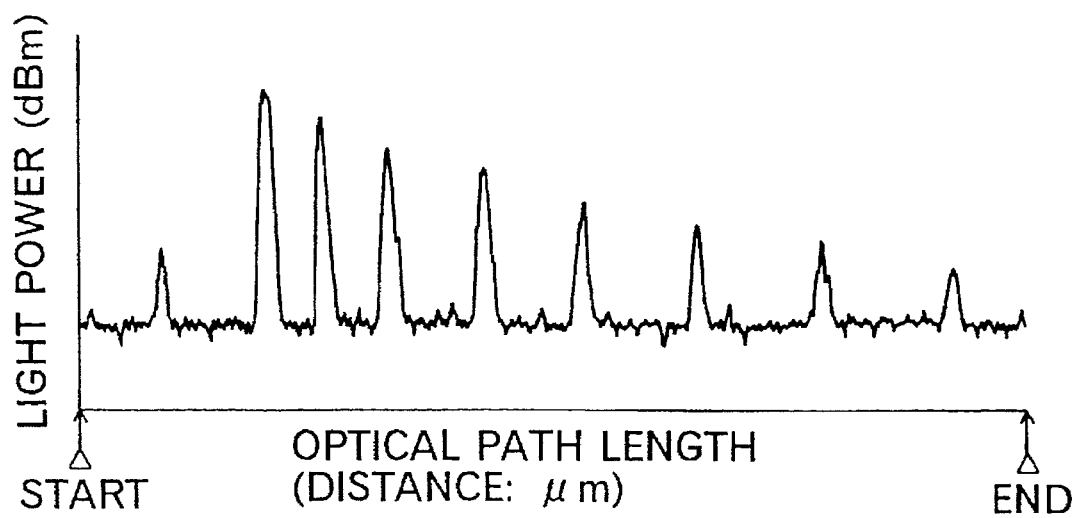
FIG. 20 is a graph showing a reflected waveform of return light of the optical waveguide component $G_3$.
Figure 21:
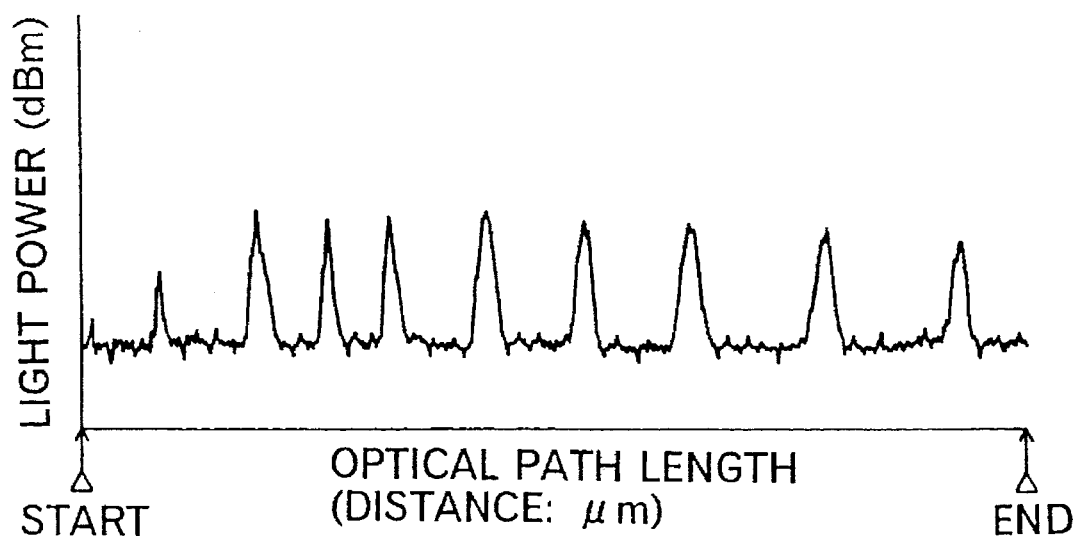
FIG. 21 is a graph showing another reflected waveform.

As seen from FIGS. 20 and 21, multiple reflection between the reflecting elements $R_1$ to $R_8$ does not occur in this optical waveguide component $G_3$, so that a bit pattern corresponding accurately to the arrangement locations of the reflecting elements can be obtained.

Embodiment 5

Figure 22:
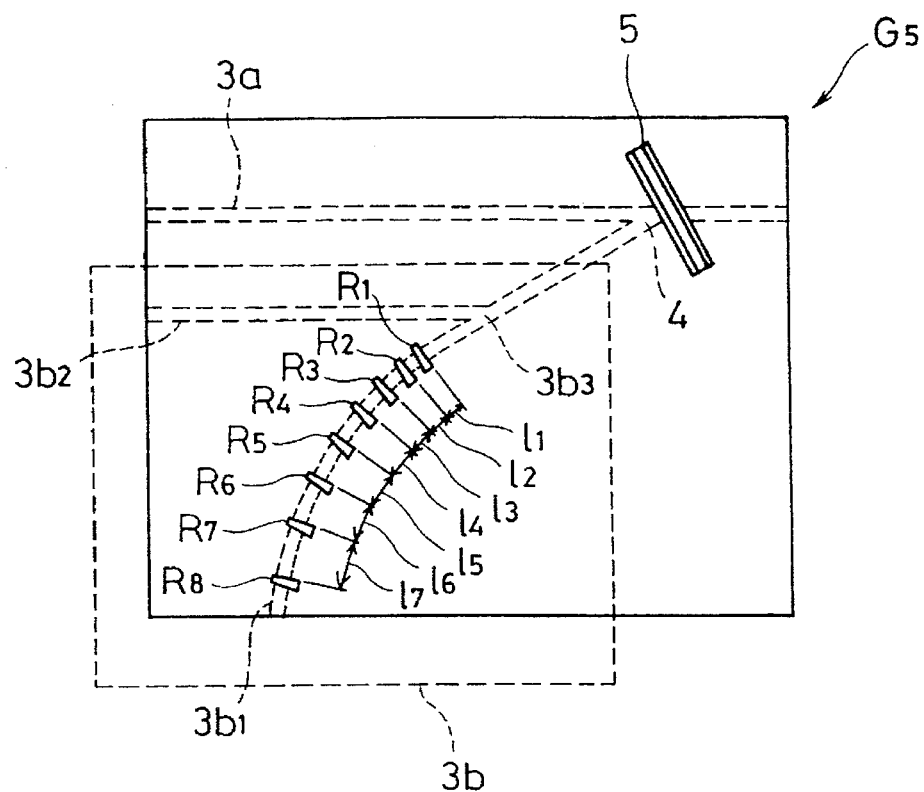
FIG. 22 is a plan view showing a typical planar pattern of an optical waveguide component $G_5$ of the present invention.

FIG. 22 is a view showing a planar pattern of another optical waveguide component $G_5$ of the present invention.

In this optical waveguide component $G_5$, the branch waveguide 3b branching from the main waveguide 3a at the branch portion 4 has a Y branch waveguide pattern as indicated by an enclosure of broken lines in the figure.

On one waveguide $3b_1$ of this Y branch waveguide, reflecting elements $R_1$ to $R_8$ with different intervals are arranged as shown in FIG. 22, while the other waveguide $3b_2$ extends to the end on the light input side.

The optical waveguide component $G_5$ of this construction is preferable because the filter element 5 can be formed as described below.

Figure 23:
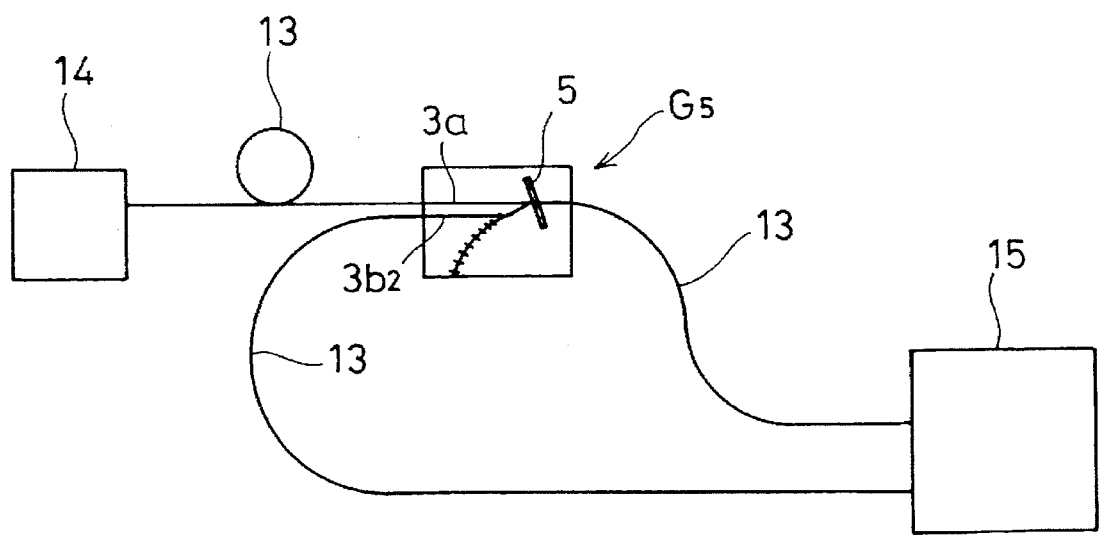
FIG. 23 is a schematic view showing a suitable example of operation in the case where a filter element of the optical waveguide component $G_5$ is formed.

As shown in FIG. 23, the input end of the main waveguide 3a of the optical waveguide component $G_5$ is first connected to a light source 14 via an optical fiber 13, and the output end of the main waveguide 3a is connected to a light output meter 15 via an optical fiber 13. And also, the other waveguide $3b_2$ of the branch waveguide 3b is connected to the light output meter 15 via an optical fiber 13.

The next work is to insert and fix a thin film filter into the slit engraved at the branch portion to form the filter element while monitoring light is sent from the light source 14. When the thin film filter is inserted and fixed into the slit in the best condition, the light output detected by the light output meter 15 is maximized. Thereupon, the fixing condition with the lowest loss can be confirmed and the amount of loss can be determined.

For this optical waveguide component $G_5$, the light power of the regenerating light with a wavelength of $\lambda_2$ reflected by the reflecting elements $R_1$ to $R_8$ can be measured, and the loss at the filter element 5 can also be measured.

For example, the other waveguide $3b_2$ of the branch waveguide 3b is connected to the light output meter 15 as shown in FIG. 23 with the optical waveguide component $G_5$ being incorporated in an optical communication system, a signal light with a wavelength of $\lambda_1$ on which a regenerating light with a wavelength of $\lambda_2$ is superposed is inputted to the main waveguide 3a.

At this time, the light output of the regenerating light with a wavelength of $\lambda_2$, detected by the light output meter, is assumed to be $Q_1$. The light goes through the waveguides $3b_1$ and $3b_2$ after being divided into two equal parts at the Y branch portion $3b_3$ of the branch waveguide 3b. Therefore, the fact that the light output at the waveguide $3b_2$ is $Q_1$ means that the light power of the regenerating light going through the waveguide $3b_1$ is also $Q_1$, and a light with a light output of $2XQ_1$ comes to the Y branch portion $3b_3$. It means that at the filter element 5, the amount of reflection of the regenerating light with a wavelength of $\lambda_2$ is $2XQ_1$.

Accordingly, the loss at the filter element 5 can be determined from the difference between the light power of the regenerating light (wavelength $\lambda_2$) inputted to the main waveguide 3a and the light power measured by the light output meter 15.

Embodiment 6

Figure 24:
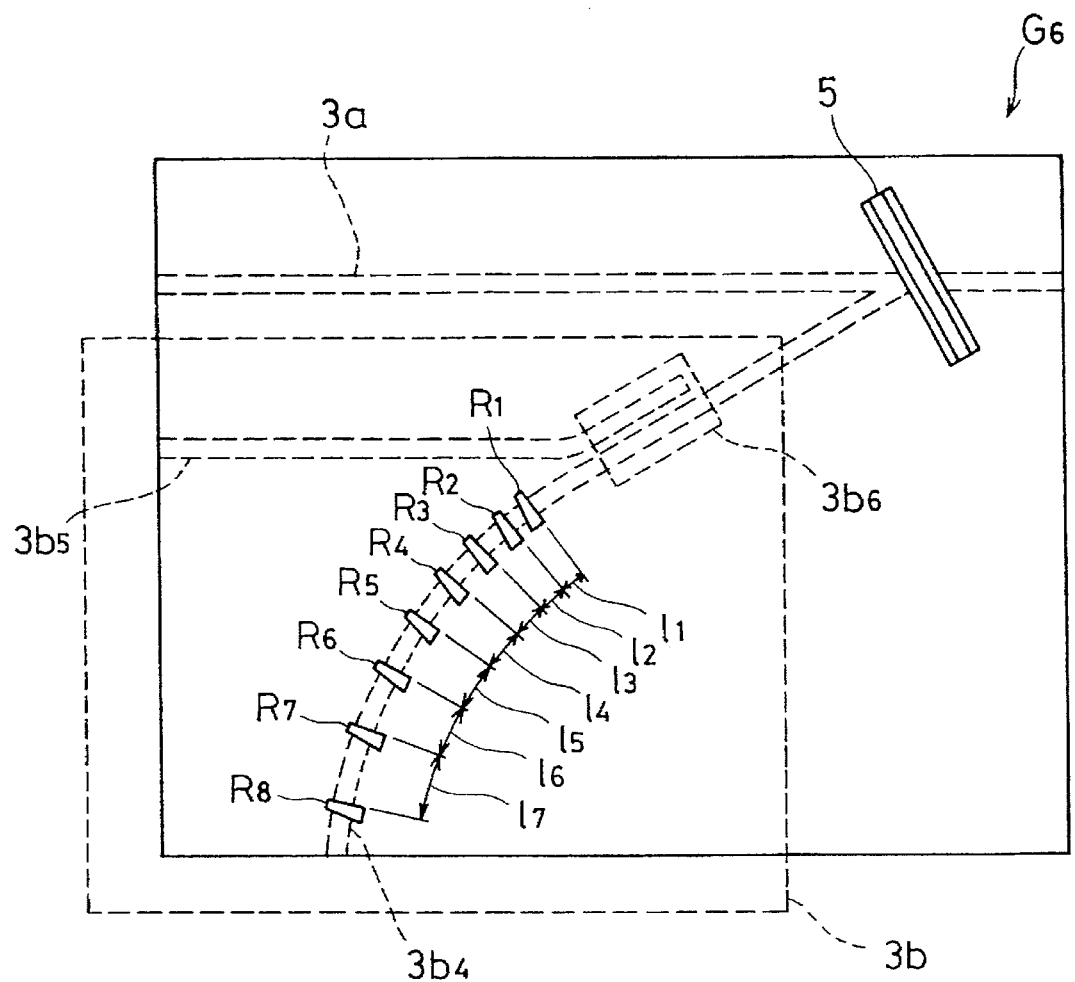
FIG. 24 is a plan view showing a typical planar pattern of an optical waveguide component $G_6$ of the present invention.

FIG. 24 is a view showing a planar pattern of another optical waveguide component $G_6$ of the present invention.

In this optical waveguide component $G_6$, the branch waveguide 3b branching from the main waveguide 3a at the branch portion 4 has a directional coupler type waveguide pattern as indicated by an enclosure of broken lines in the figure.

On one waveguide $3b_4$ of this directional coupler type waveguide, reflecting elements $R_1$ to $R_8$ with different intervals therebetween as shown in FIG. 13 are arranged, and the other waveguide $3b_5$ extends to the light input end.

For this optical waveguide component $G_6$, like the optical waveguide component $G_5$ shown in FIG. 22, the filter element 5 can be formed by connecting the output ends of the waveguide $3b_5$ and the main waveguide 3a to a light power meter, by which the best fixing condition of thin film filter can be achieved.

By forming the directional coupling portion $3b_6$ so that the coupling ratio at the directional coupling portion $3b_6$ takes a predetermined value, the light power of the regenerating light (wavelength $\lambda_2$) going through the waveguide $3b_4$ can be monitored, and simultaneously the loss at the filter element 5 can be measured.

For example, when the directional coupling portion $3b_6$ is designed so that 90% of the light power is inputted to the waveguide $3b_4$ and 10% thereof is to the waveguide $3b_5$, the other waveguide $3b_5$ of the branch waveguide 3b is connected to the light output meter, and a signal light with a wavelength of $\lambda_1$ on which a regenerating light with a wavelength of $\lambda_2$ is superposed is inputted to the main waveguide 3a.

At this time, if the light power of the regenerating light with a wavelength of $\lambda_2$, detected by the light output meter, is assumed to be $Q_2$, the light power of the regenerating light going through the waveguide $3b_4$ on which the reflecting elements $R_1$ to $R_8$ are arranged is $9 \times Q_2$. The total light power of the regenerating light inputted to the directional coupling portion $3b_6$, that is, the amount of reflection at the filter element 5 is $Q_2 + 9 \times Q_2 = 10 \times Q_2$.

Accordingly, the loss at the filter element 5 can be determined from the difference between the light power of the regenerating light (wavelength $\lambda_2$) inputted to the main waveguide $3a$ and the light power measured by the light output meter.

What is claimed is:

1. An optical waveguide component comprising:

at least one main waveguide through which signal light and regenerating light propagate, and a branch waveguide branching from said at least one main waveguide, said at least one main waveguide and said branch waveguide being formed on a common substrate;

a filter element, disposed at a branch portion where said branch waveguide branches from said at least one main waveguide, for reflecting said regenerating light to send said regenerating light to said branch waveguide; and a plurality of reflecting elements, each having two reflecting faces, arranged in an extending direction of said branch waveguide and intersecting said branch waveguide, for reflecting said regenerating light;

one reflecting face of said two reflecting faces being a face for reflecting said regenerating light to said filter element, and the other reflecting face of said two reflecting faces being a face for reflecting said regenerating light in a direction deviating from a light axis direction of said branch waveguide.

2. An optical waveguide component according to claim 1, wherein one reflecting face of said two reflecting faces of said reflecting element is at right angles to the light axis direction of said branch waveguide and the other reflecting face is inclined with respect to the light axis direction of said branch waveguide.

3. An optical waveguide component according to claim 1, wherein said reflecting element has a trapezoidal pattern when viewed in plan.

4. An optical waveguide component according to claim 1, wherein said reflecting element is a slit engraved on said branch waveguide.

5. An optical waveguide component according to claim 1, wherein the reflecting elements have a trapezoidal pattern with a head and bottom, and adjacent reflecting elements are arranged so that the head and the bottom of the pattern of adjacent reflecting elements are positioned alternately.

6. An optical waveguide component in which an optical waveguide component defined in claim 1 is contained in a housing, and pin fitting holes for the connection of an optical fiber connector are formed in a connecting end surface of said housing.

7. A light signal processing method comprising the steps of:

inputting a light signal including a signal light and a regenerating light to a main waveguide of an optical waveguide component defined in claim 1;

detecting the light signal as reflected by a filter element and light signals reflected by a plurality of reflecting elements in sequence; and setting a time when the light signal reflected by one of:
   (a) said filter element and
   (b) one of said reflecting elements is detected to a processing start time.

8. An optical waveguide component comprising:

at least one main waveguide through which signal light and regenerating light propagate, and a branch waveguide branching from said at least one main waveguide, said at least one main waveguide and said branch waveguide being formed on a common substrate;

a filter element, disposed at a branch portion where said branch waveguide branches from said at least one main waveguide, for reflecting said regenerating light to send said regenerating light to said branch waveguide; and a plurality of reflecting elements, each having two reflecting faces, arranged in an extending direction of said branch waveguide and intersecting said branch waveguide, for reflecting said regenerating light;

intervals between said reflecting elements being different from each other.

9. An optical waveguide component according to claim 8, wherein a planar pattern of said branch waveguide is one of:
   (a) a Y branch waveguide pattern and
   (b) a directional coupler waveguide pattern.

10. An optical waveguide component according to claim 1, wherein said filter element is formed by inserting a thin film filter of dielectric thin film construction in a slit engraved at said branch portion.

11. An optical waveguide component according to claim 8, wherein said filter element is formed by inserting a thin film filter of dielectric thin film construction in a slit engraved at said branch portion.

* * * * *